US009883656B1

(12) United States Patent
Turner (10) Patent No.: US 9,883,656 B1
(45) Date of Patent: Feb. 6, 2018

(54) HOUSE BREAKING TRAINING HARNESS FOR A CANINE USING BODY POSITION MEASUREMENTS (71) Applicant: Phillip Turner, Warrenton, VA (US)

(72) Inventor: Phillip Turner, Warrenton, VA (US)

(*) Notice: Subject to any disclaimer, the term of this patent is extended or adjusted under 35 U.S.C. 154(b) by 212 days.

(21) Appl. No.: 14/797,023

(22) Filed: Jul. 10, 2015

Related U.S. Application Data (60) Provisional application No. 62/022,656, filed on Jul. 10, 2014.

(51) Int. Cl.
*A01K 15/02* (2006.01)
*A01K 27/00* (2006.01)

(52) U.S. Cl.
CPC .......... *A01K 15/021* (2013.01); *A01K 27/002* (2013.01)

(58) Field of Classification Search
CPC .... A01K 15/02; A01K 15/021; A01K 15/022; A01K 15/023; A01K 15/04; A01K 27/002; A01K 29/005
See application file for complete search history.

(56) References Cited

U.S. PATENT DOCUMENTS

| 5,005,525 A | 4/1991 | Stanton |
| 5,054,428 A | 10/1991 | Farkus |
| 5,226,386 A | 7/1993 | Thoma |
| 5,762,028 A | 6/1998 | Owings |
| 5,762,030 A | 6/1998 | Paglericcio et al. |
| 5,791,295 A | 8/1998 | Scmid et al. |
| 5,857,433 A | 1/1999 | Files |
| 5,911,199 A | 6/1999 | Farkas et al. |
| 6,047,664 A | 4/2000 | Lyerly |
| 6,170,439 B1 | 1/2001 | Duncan et al. |
| 6,263,836 B1* | 7/2001 | Hollis ............... A01K 15/021 119/712 |
| 6,487,992 B1 | 12/2002 | Hollis |
| 6,598,563 B2* | 7/2003 | Kim ................... A01K 15/021 119/719 |
| 6,860,239 B1 | 3/2005 | Begun |
| 7,111,586 B2* | 9/2006 | Lee .................... A01K 15/021 119/719 |
| 7,209,043 B2 | 4/2007 | Anderson |
| 7,559,291 B2 | 7/2009 | Reinhart |
| 8,011,327 B2* | 9/2011 | Mainini .............. A01K 27/009 119/720 |
| 8,098,164 B2 | 1/2012 | Gerig et al. |
| 8,402,924 B2 | 3/2013 | Pacheco et al. |
| 8,477,037 B2 | 7/2013 | So |
| 2004/0189477 A1* | 9/2004 | Hisano ............... A01K 15/021 340/573.3 |

(Continued)

OTHER PUBLICATIONS

"Petful", Petful.com, Published May 3rd, 2012, acessed May 12th, 2017, <http://www.petful.com/behaviors/dog-housetraining-tips-from-vets/>.*

*Primary Examiner* — Joshua Rodden
(74) *Attorney, Agent, or Firm* — E. Jay Wilusz (57) ABSTRACT

An improved house training harness for a puppy or a dog that detects canine urination, defecation, and territory marking body positions. If any of these forbidden body positions are detected inside the house, the dog receives an immediate inhibiting rib vibration that prevents liquid or solid elimination or marking and the owner is notified that the dog needs to go outside.

8 Claims, 11 Drawing Sheets

(56) References Cited

U.S. PATENT DOCUMENTS

| | | | |
|---|---|---|---|
| 2006/0011145 A1* | 1/2006 | Kates | A01K 15/021 119/719 |
| 2006/0011146 A1 | 1/2006 | Kates | |
| 2006/0112898 A1 | 6/2006 | Fjelstad et al. | |
| 2007/0125306 A1 | 6/2007 | Beecher | |
| 2007/0266961 A1 | 11/2007 | Johnson | |
| 2007/0287971 A1 | 12/2007 | Roe et al. | |
| 2008/0036610 A1 | 2/2008 | Hokuf et al. | |
| 2008/0052030 A1 | 2/2008 | Olson | |
| 2008/0058745 A1 | 3/2008 | Long et al. | |
| 2008/0084316 A1* | 4/2008 | Panton | A01K 15/021 340/573.3 |
| 2008/0173255 A1* | 7/2008 | Mainini | A01K 15/022 119/720 |
| 2008/0264352 A1 | 10/2008 | Peinetti et al. | |
| 2008/0282993 A1 | 11/2008 | Hoehn | |
| 2009/0255484 A1 | 10/2009 | Muelken | |
| 2010/0089327 A1 | 4/2010 | Gross | |
| 2010/0121292 A1 | 5/2010 | Wakrim et al. | |
| 2010/0209898 A1 | 8/2010 | Ward | |
| 2010/0263603 A1* | 10/2010 | Baron | A01K 13/006 119/850 |
| 2011/0061605 A1 | 3/2011 | Hardi et al. | |
| 2011/0193706 A1 | 8/2011 | Dickerson | |
| 2012/0312250 A1* | 12/2012 | Jesurum | A01K 15/023 119/721 |
| 2013/0014706 A1 | 1/2013 | Menkes | |
| 2013/0112153 A1 | 5/2013 | So et al. | |
| 2013/0169441 A1* | 7/2013 | Wilson | A01M 29/10 340/573.3 |
| 2013/0207803 A1 | 8/2013 | Charych | |
| 2014/0020635 A1 | 1/2014 | Sayers et al. | |
| 2014/0326196 A1* | 11/2014 | Lauscher | A01K 15/02 119/720 |
| 2015/0122199 A1* | 5/2015 | Koplin | A01K 15/021 119/718 |
| 2016/0198682 A1* | 7/2016 | Brasfield | A01K 15/02 604/507 |
| 2017/0006834 A1* | 1/2017 | Waters | A01K 27/002 |
| 2017/0079247 A1* | 3/2017 | Womble | A01K 27/009 |

* cited by examiner

HOUSE BREAKING TRAINING HARNESS FOR A CANINE USING BODY POSITION MEASUREMENTS

CROSS REFERENCE

This application claims the priority of Provisional Application No. 62/022,656 filed on Jul. 10, 2014.

PROGRAM

This application includes a computer program flow chart.

BACKGROUND

Prior Art

The following is a tabulation of some pet training prior art that presently appears to have some relevance:

| U.S. Patents | | |
| --- | --- | --- |
| Pat. No. | Issue Date | Patentee |
| 6,860,239 | Mar. 1, 2005 | Begun |
| 5,226,386 | Jul. 13, 1993 | Thoma |
| 5,005,525 | Apr. 9, 1991 | Stanton |

| U.S. Patent Application Publications | | |
| --- | --- | --- |
| Publication Nr. | Pub Date | Applicant |
| 2008/0282993 | Nov. 20, 2008 | Hoehn |
| 2008/0084316 | Apr. 10, 2008 | Panton |
| 2007/0266961 | Nov. 22, 2007 | Johnson |
| 2006/0011146 | Jan. 19, 2006 | Kates |

Dogs have acquired the reputation, justly gained over centuries of domestication, of being man's best friend. But a major problem remains to this day—man's best friend must be house-trained to live happily in doors with most human owners. A best friend is no friend if not housebroken.

Housebreaking a dog is a complicated and time-consuming problem for most people. The dog is usually confined or closely watched to allow human intervention and training at the teachable moment. But this training moment passes very quickly because dogs have a limited ability to associate past behavior with present owner interaction.

The untrained dog cannot be trusted and is usually confined. Often, an expensive cage is acquired or an entire room in the house is designated as a confinement area. This can be a significant commitment of space for the dog owner in a small apartment. And the dog is not learning to be house broken while being confined. The dog is learning how to "hold it" but is not learning how, and where, it is acceptable to "let it go".

Another downside is that the owner's time is usually filled and controlled by the dog's training requirements over a period that often takes weeks, sometimes without training success. Unconstrained dogs being house trained can be sneaky. They will often bide their time till they can slip away unnoticed to a quiet out of the way room or hall to relieve themselves in peace. And once the dog has relieved itself indoors, that spot is usually marked, in the dog's mind, as a good place to go again. Any phone call, conversation, or front door visitor can distract the dog watching owner who is attempting to prevent this from happening while house training the dog. In many cases, there will be in home messes that must be cleaned up as the dog is house trained.

Money is often spent on carpet and floor cleaners, brushes, or training mats. Sometimes the only acceptable remedy, after an extended house breaking session, is an entire carpet or rug replacement. The canine house training problem has been so difficult, dirty, and expensive that it has prevented some families from even thinking about acquiring an untrained puppy or dog at all. That family often remains pet-less or they compromise and become cat people.

A patent search turned up some references that appear not to be very relevant. The references are listed here for completeness and will be included in a follow-on Information Disclosure Document. They comprise Anderson, Beecher, Charych, Dickerson, Duncan, Farkas, Farkus, Files, Fjelstad, Gerig, Gross, Hardi, Hokuf, Hollis, Lee, Long, Lyerly, Mainini, Menkes, Muelken, Olson, Owings, Pacheco, Paglericcio, Peinetti, Reinhart, Roe, Sayers, Schmid, So, Wakrim, and Ward.

As to the relevant prior art, Begun describes a vertical wall or vertical surface mounted cat spray detection system that alerts the owner but does not prevent the cat spray from occurring. The cat spray still requires clean up. And Begun also does not address the housebreaking problems of dog urination or defecation on an indoor floor.

Hoehn describes a classic operant conditioning training method for teaching a dog to indicate (using a bell hung from a door handle) that the dog needs to go outside to relieve itself. Hoehn's method requires a significant time commitment from the owner and patient extensive interaction with the dog, as Hoehn states, over an "extended time period". The dog must be taught two subsequent behaviors, pawing the bell on the door, and then urinating or defecating outside the home. During this extended training period the dog is at risk of relieving itself in the house. Hoehn also states that the dog may forget the training and may need to be retrained. Hoehn requires the average dog owner to become an accomplished, and perhaps even a repetitive dog trainer.

Johnson describes a dog restraint system, a hobble with two back leg cuffs, that prevents a dog from lifting a hind leg to mark territory inside the home. Johnson's device restricts the lifting of a dog's leg in the house but it does not teach the dog not to mark territory indoors. Johnson also does not address the problems of dog urination without leg lifting or dog defecation indoors.

Kates describes a computer based training system that barely mentions an indoor dog toilet but provides no mechanism for teaching a dog that the dog toilet should be outside the home. Kates also does not address the dog housebreaking problem with any design, detailed description, or operational information.

Panton describes an electrified garment that the dog wears while indoors. The garment includes an electronic sensor that detects the release of urine and a laser detector that detects the very imminent release of solid waste. A loud alarm is sounded that alerts the owner and, according to Panton, stops the dog from further urination or defecation. It is difficult for the dog to stop the urination or defecation function once it has progressed to a certain point, loud alarm or not. Panton admits this flaw. Panton's device does allow timely owner interaction at the teachable moment but does little to prevent the indoor mess from occurring. Panton later claims the prevention of any urination or defecation but contradicts himself when he also states that his sensors work on a urine stream or a stool passage. While Panton provides some support for timely owner notification and training interaction, he simply does not detect the urination or defecation event soon enough to prevent in home occurrence.

Stanton describes a dog diaper that captures or prevents the release of territory marking urine but provides no mechanism to teach the dog that territory is not to be marked indoors or that urination should occur outside. Stanton also does not address the problem of indoor defecation.

Thoma describes a dog diaper system that captures and detects a urine stream and sounds an audible alarm. This allows for timely owner interaction during the urination or territory marking teachable moments but provides nothing for the indoor defecation problem.

SUMMARY

A first embodiment includes a dog harness that is worn while a puppy or a dog is being house broken. The dog's calibrated body position relative to the ground is monitored by an on-harness computer. If a forbidden body position is detected while the dog is in the house, a smartphone alert is sent and a buzzer is sounded to indicate to the owner that the dog needs to go outside. Concurrently, the dog receives a surprising rib cage tickle from a harness mounted vibrator that inhibits the bodily function that the dog is just about to execute.

The dog harness provides a mounting point for a dog monitor box over the dog's shoulders and connection points for two vibrating rib ticklers attached in close proximity to the dog's left and right side ribcage. Two distance measuring sensors are attached on the lower harness center line belly strap. These sensors are protected by a protruding chest guard that prevents the dog from laying down directly on the sensors. The dog also wears two back foot boots with pressure switches that activate if the dog lifts and holds a leg to mark territory in the house. The monitor box includes a microprocessor, a battery, a buzzer alarm, three position alarm indicator lights, an alarm reset pushbutton, a guard/yard mode selector switch, an on/off selector switch, and an on indicator light. All electronic parts are connected via a wire harness that is sewn into the dog harness. A software program running on a smartphone is used to calibrate the dog's forbidden body positions and is also used to receive an alert sent from the monitor box when a forbidden body position is detected inside the house.

DRAWINGS—REFERENCE NUMERALS

Figure 5:
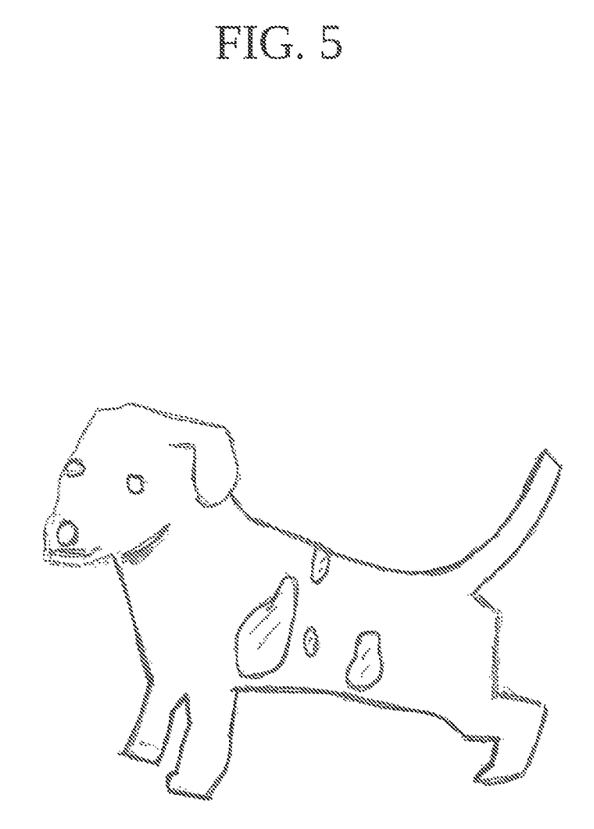
FIG. 5 shows a puppy in the crouch or urination position.
Figure 6:
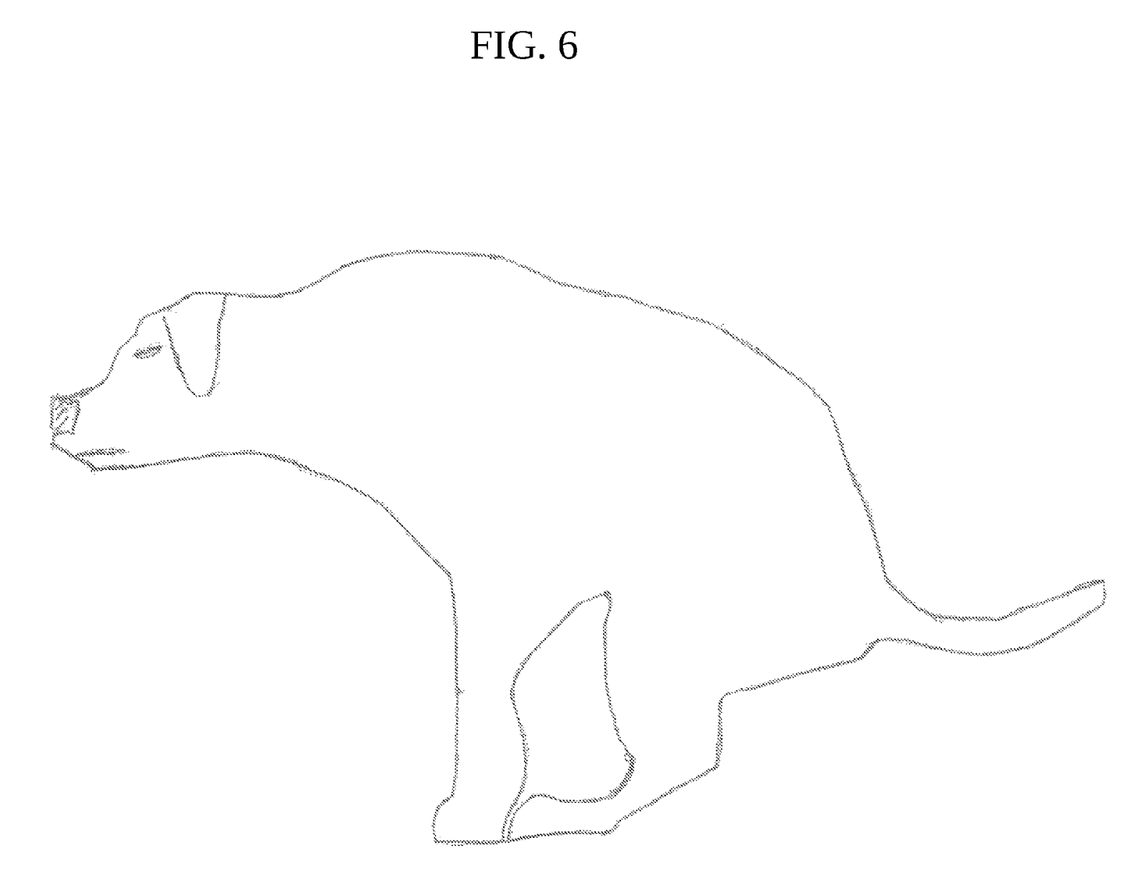
FIG. 6 shows a dog in the squat or defecation position.
Figure 7:
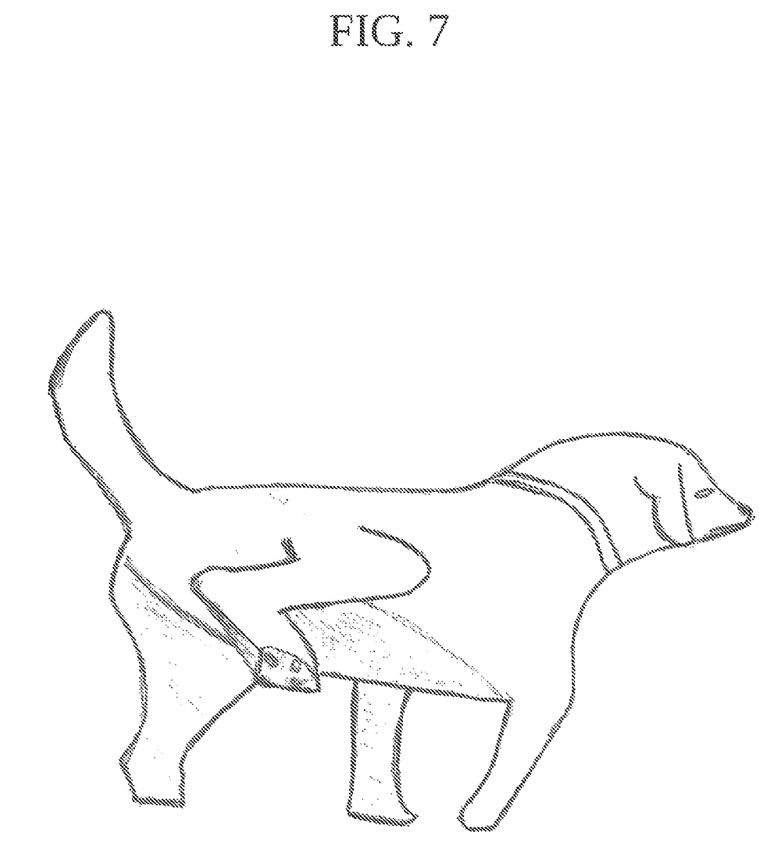
FIG. 7 shows a dog in the leg lift or territory marking position.
Figure 8:
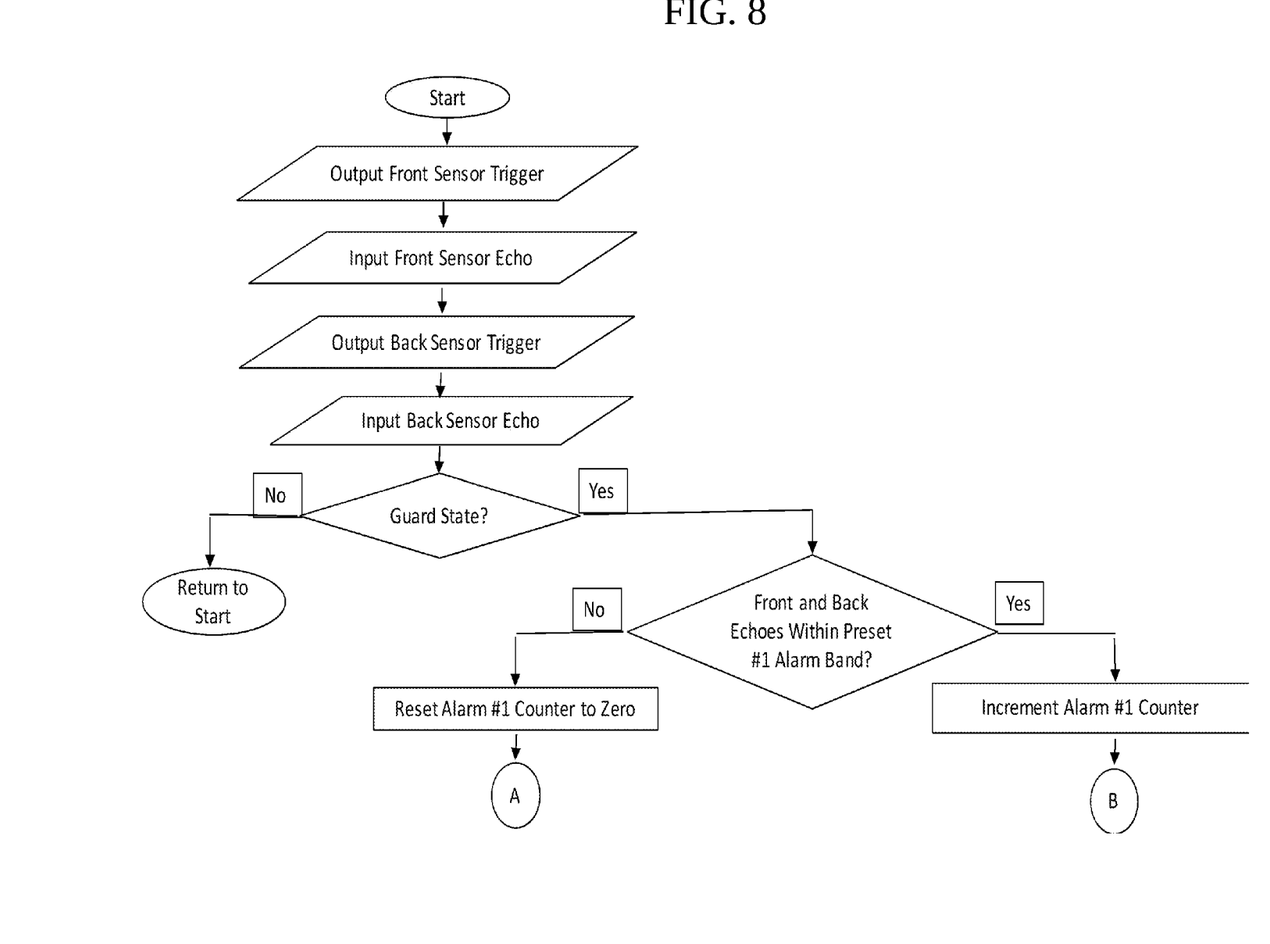
FIG. 8 shows 1 of 4 drawings of a software flowchart.
Figure 9:
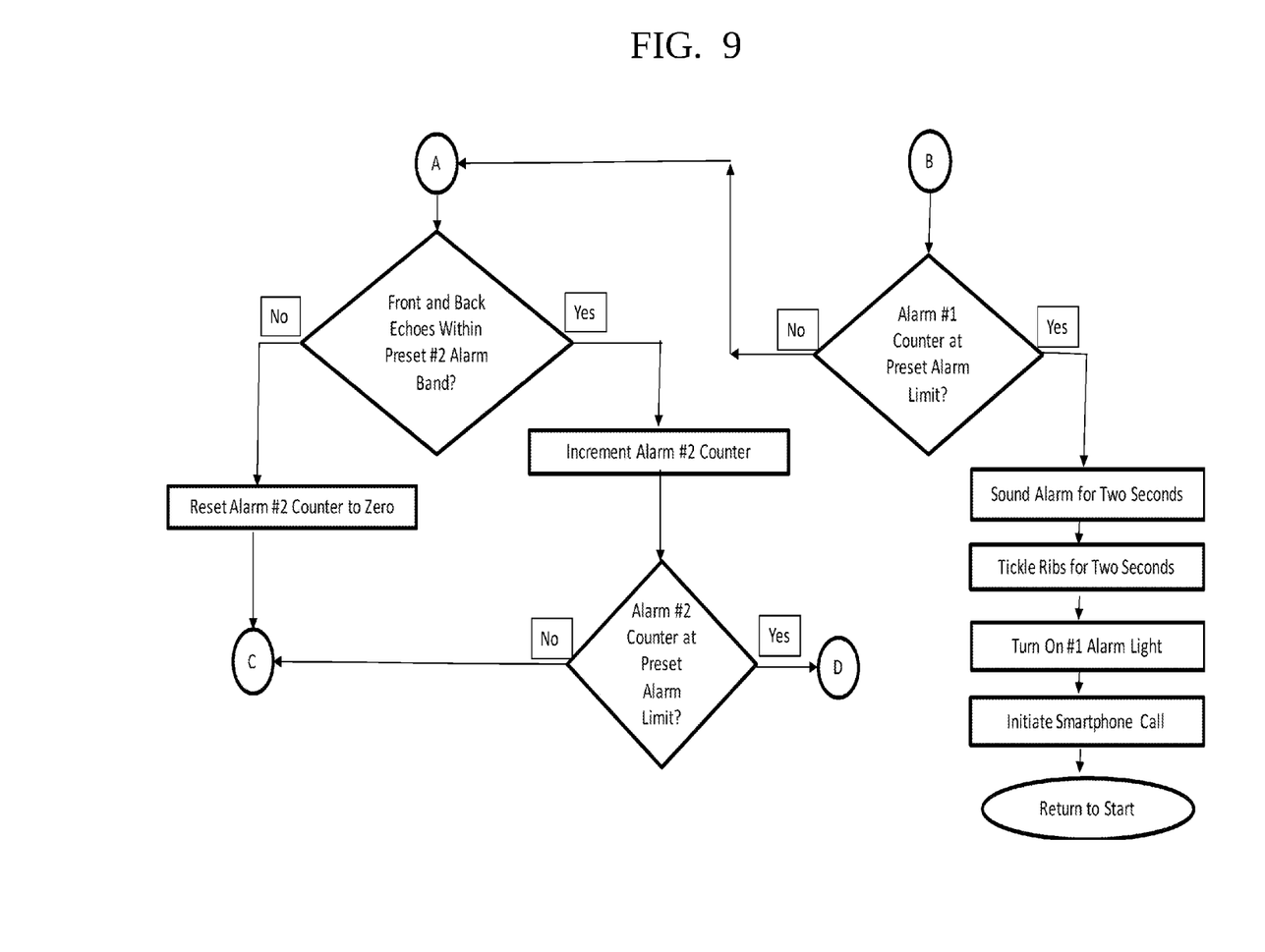
FIG. 9 shows 2 of 4 drawings of a software flowchart.
Figure 10:
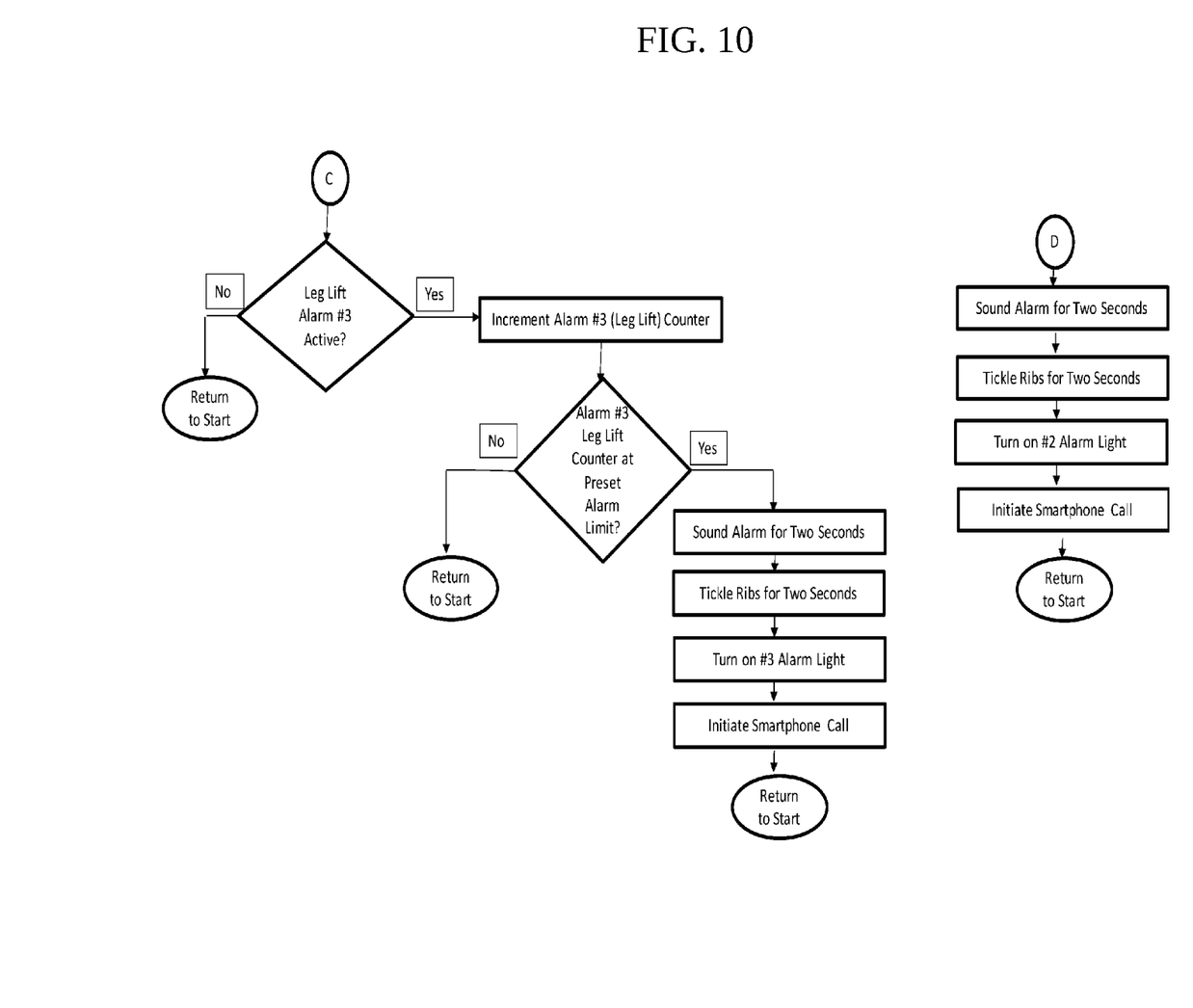
FIG. 10 shows 3 of 4 drawings of a software flowchart.
Figure 11:
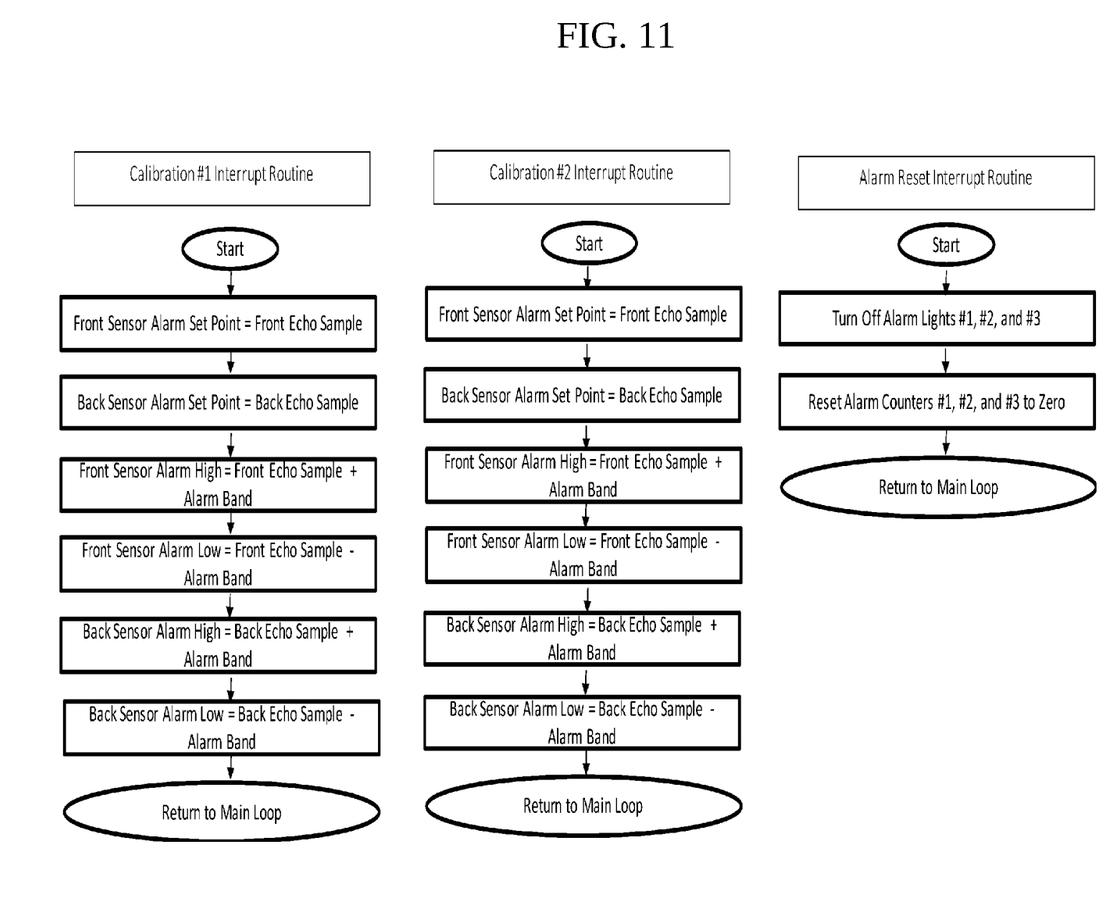
FIG. 11 shows 4 of 4 drawings of a software flowchart.

20 smartphone
22 calibration box
24 calibration box d-ring
26 calibration signal cable
28 calibration box cable clip
30 strength cable
32 dog harness cable clip
34 dog harness d-ring
36 calibration cable plug
38 monitor box connector
40 monitor box
42 dog harness
44 wire harness
46 right rib tickler
48 left rib tickler (not shown)
50 back distance sensor
52 front distance sensor
54 chest guard
56 right back foot boot
58 left back foot boot
60 right boot pressure switch
62 left boot pressure switch
64 buzzer alarm
66 #1 position alarm indicator light
68 #2 position alarm indicator light
70 #3 position alarm indicator light
72 alarm reset pushbutton
74 guard/yard mode selector switch
76 on/off selector switch
78 on indicator light
80 calibrate 1 pushbutton
82 calibrate 2 pushbutton
84 rib tickler test pushbutton Detailed Description—First Embodiment One or more embodiments present the following advantages. The monitor box microprocessor is fast enough to operate in real time inside the dog's physiological waste elimination and territory marking execution cycles. During these cycles the dog first assumes a specific body position (See FIG. 5, FIG. 6, and FIG. 7) and then must relax for a period of time before actual external elimination or marking happens. The dog's forbidden in-house body positions are quickly detected by the microprocessor that then triggers a strong inhibition stimulation, a disconcerting rib tickle, before liquid or solid bodily elimination or marking behaviors occur.

Four benefits result. First, the dog learns, during the short teachable moment, that going or marking "there" in the house is not acceptable. Second, effective dog training is made possible, by a timely owner alert, without the usual trigger event of a mess in the house that requires post training cleanup. Third, the untrained dog is automatically monitored by the system while in the house without requiring the constant attention of the owner. Fourth, money is saved that would have been spent on an expensive cage, cleaning products, or floor covering replacement. Housebreaking can now be completed in an easier, quicker, and more effective fashion.

Figure 1:
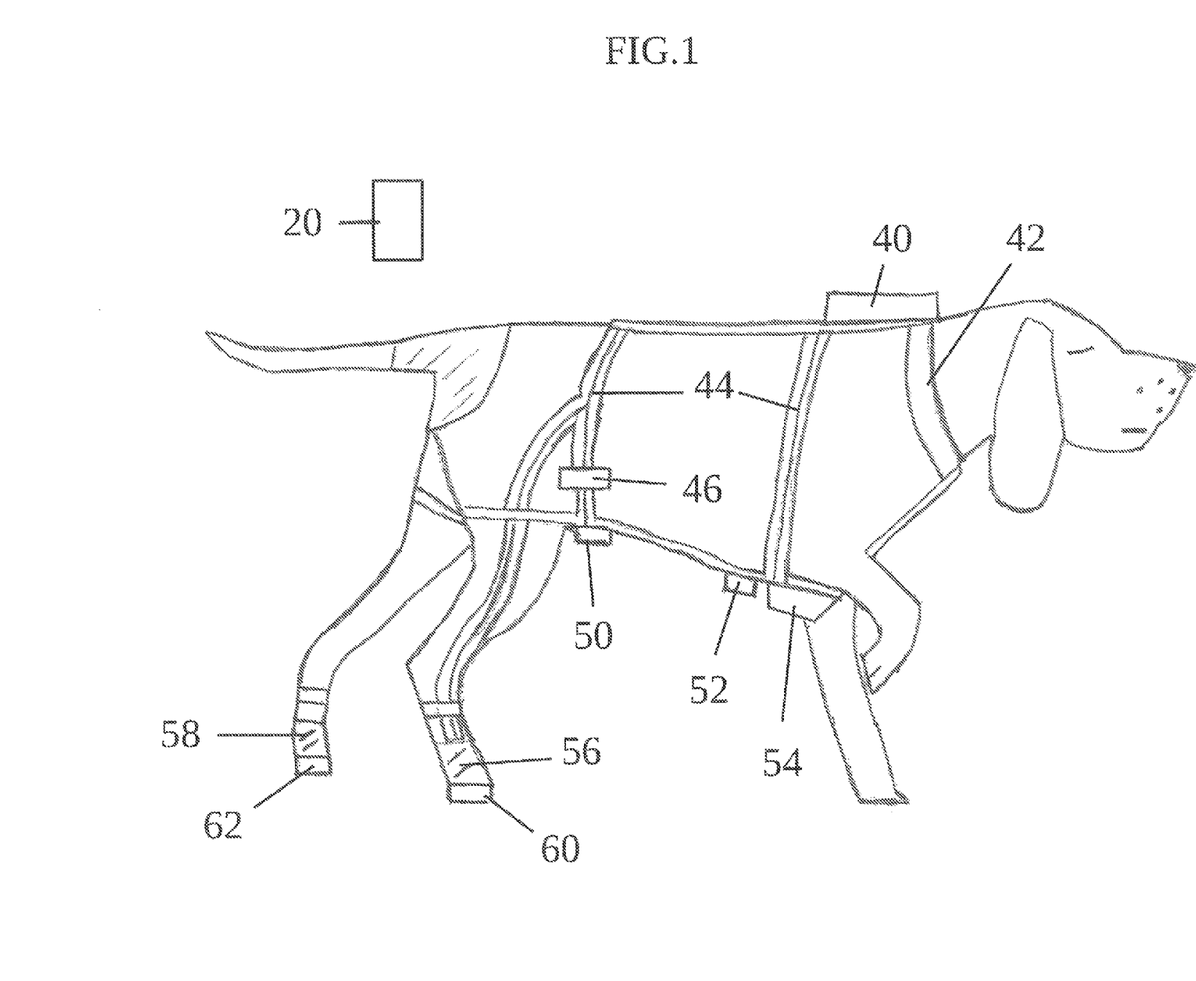
FIG. 1 is a side view of a dog wearing a harness configuration for house training.
Figure 2:
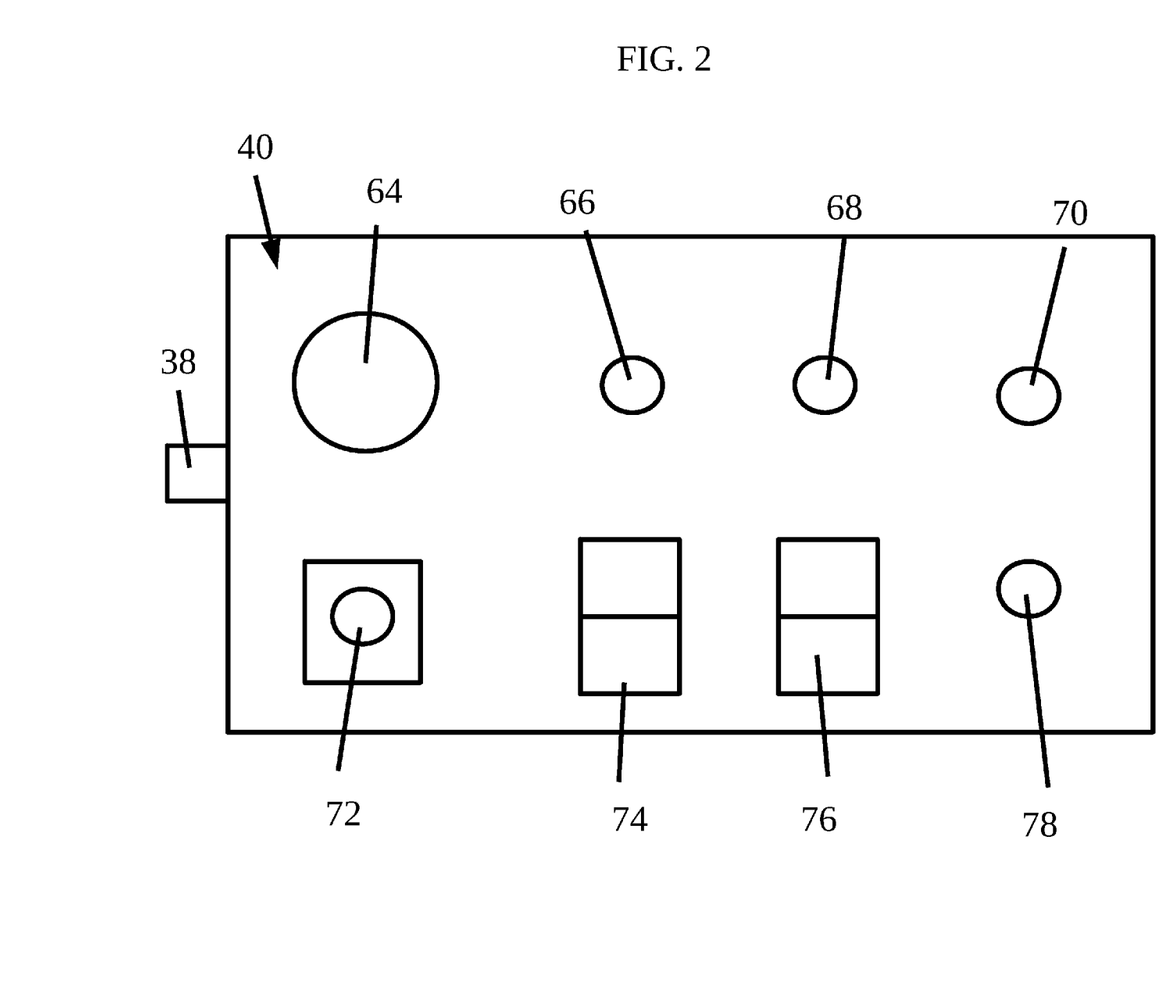
FIG. 2 is a top view of the monitor box.

One embodiment is illustrated in FIG. 1 and FIG. 2. The dog (FIG. 1) wears a dog harness 42 that supports the attachment of a monitor box 40 over the dog's shoulders. The monitor box 40 (FIG. 2) includes a buzzer alarm 64, a #1 position alarm indicator light 66, a #2 position alarm indicator light 68, a #3 position alarm indicator light 70, an alarm reset pushbutton 72, a guard/yard mode selector switch 74, an on-off selector switch 76, and an on indicator light 78. The monitor box 40 contains a microprocessor (not shown), a battery (not shown), a battery holder (not shown), and an interconnection board (not shown). The monitor box 40 (FIG. 1) is attached to the dog harness 42 by hook and loop fasteners (not shown) that are glued to the monitor box bottom and to the top of the dog harness 42. A front distance sensor 52 pointed at the ground is mounted on the dog harness 42 at the dog's chest. A back distance sensor 50 pointed at the ground is mounted on the dog harness 42 at the dog's belly. A left rib tickler 48 (not shown) is attached to the dog harness 42 at the dog's left lower rib cage. A right rib tickler 46 is attached to the dog harness 42 at the dog's right lower rib cage. A chest guard 54 is mounted on the dog harness 42 just in front of the front distance sensor 52. The dog wears a right back foot boot 56 that contains a right boot pressure switch 60. The dog also wears a left back foot boot 58 that contains a left boot pressure switch 62. All sensors, ticklers, and pressure switches are electrically connected to the microprocessor by a wire harness 44 sewn into the dog harness 42. A dog training cell phone application (not shown) is downloaded into the owner's smartphone 20.

Operational Description—First Embodiment

To understand this operational description refer to FIG. 1, FIG. 2, FIG. 5, FIG. 6, and FIG. 7. The training harness must be calibrated on the puppy or dog before house break training can occur. The owner downloads a house-breaking application (not-shown) from the internet onto his smartphone 20 (FIG. 1). Before the usual time when the canine urinates or defecates the owner activates the calibration function on his smartphone 20, puts the puppy or dog into the dog harness 42 (FIG. 1), turns the on/off selector switch 76 on the monitor box 40 (FIG. 2) to the "on" position, and turns the guard/yard mode selector switch 74 on the monitor box 40 (FIG. 2) to the "yard" position. The on indicator light 78 turns on to indicate successful activation of the system and the yard mode prevents the system from alarming when the canine relieves itself during the calibration process. The puppy or dog is then placed in an enclosed yard, deck, or porch area and watched by the owner. When the canine assumes position one and urinates (see FIG. 5) the owner pushes the one button on the smartphone 20, for #1 calibration, and the monitor box microprocessor responds by recording the front distance sensor 52 and the back distance sensor 50 ground distance readings. The system is now calibrated for this puppy or dog so that the microprocessor will recognize the forbidden #1 body position when the canine is in the house and the system is in the "guard" mode. When the puppy or dog assumes position two and defecates (see FIG. 6), the owner pushes the two button on the smartphone 20, for #2 calibration, and the monitor box microprocessor responds by recording the front distance sensor 52 and the back distance sensor 50 ground distance readings. The system is now calibrated for this canine so that the microprocessor will recognize the forbidden #2 body position when the puppy or dog is in the house and the system is in the "guard" mode. The position 3, leg lift marking position (see FIG. 7) is so distinct from other canine body positions that calibration is not required for the monitor box microprocessor to recognize this position.

The owner now moves the guard/yard mode selector switch 74 on the monitor box 40 (FIG. 2) from "yard" mode to "guard" mode and releases the canine into the house. The microprocessor monitors the puppy or dog's body position relative to the ground by sampling the front distance sensor 52 and the back distance sensor 50 data up to 10 times a second. The microprocessor also monitors the right boot pressure switch 60 in the right back foot boot 56 and the left boot pressure switch 62 in the left back foot boot 58. If the canine assumes and holds forbidden body positions #1, #2, or #3 in the house, an alarm condition is triggered. The canine receives a disconcerting inhibition stimulation from the right rib tickler 46 and the left rib tickler 48 (not shown) that cause instant muscle tightening and prevent any bodily liquid or solid elimination or marking. The appropriate monitor box alarm indicator (FIG. 2), #1 position alarm indicator light 66, #2 position alarm indicator light 68, or #3 position alarm indicator light 70 turns on so the owner knows what to watch for in the yard. At the same time, the monitor box microprocessor remotely contacts the smartphone 20 to inform the owner that the dog should immediately be let outside for urination or defecation relief, reward, or other positive reinforcement. The owner turns the guard/yard mode selector switch 74 from the "guard" to the "yard" position before the dog is let outside and pushes the alarm reset pushbutton 72 that turns #1 position alarm indicator light 66, #2 position alarm indicator light 68, or #3 position alarm indicator light 70 off. After relief and reinforcement, the owner turns the guard/yard mode selector switch 74 from "yard" mode back to "guard" mode and releases the dog into the house.

If the dog lifts a leg to mark territory while in the house (see FIG. 7), the right boot pressure switch 60 in the right back foot boot 56 or the left boot pressure switch 62 in the left back foot boot 58 will detect this and an exclusive-or function in the monitor box microprocessor program will trigger the alarm response actions as described above. These comprise activating the right rib tickler 46 and left rib tickler 48 (not shown), sounding the buzzer alarm 64, turning on the #3 position alarm indicator light 70, and initiating a smartphone 20 alert call. The #3 position alarm indicator light 70 can be turned off with the same alarm reset pushbutton 72.

Detailed Description—Second Embodiment

Figure 3:
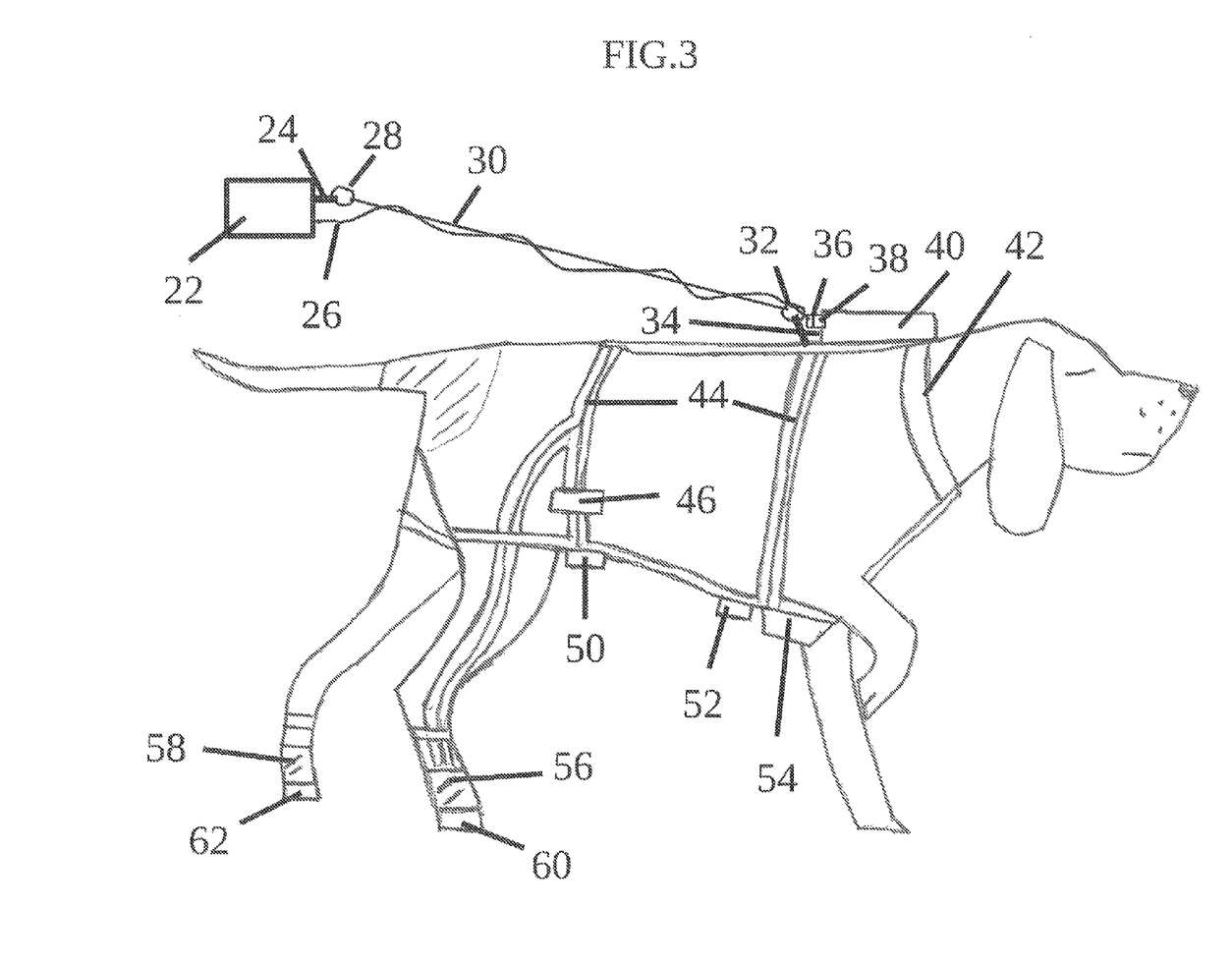
FIG. 3 is a side view of a dog wearing an alternate harness configuration for house training.
Figure 4:
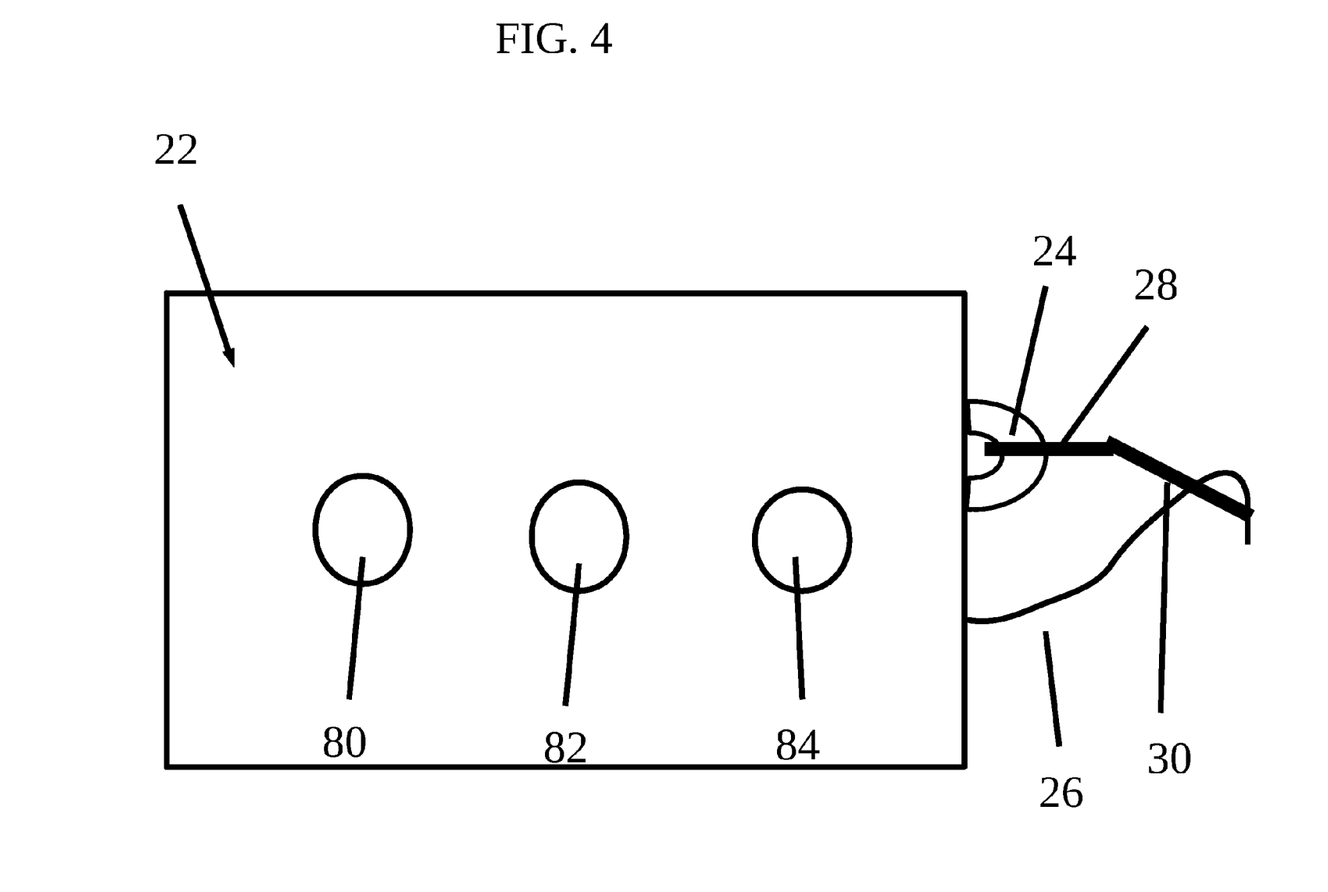
FIG. 4 is a top view of the calibration box.

A second embodiment is illustrated in FIG. 3 and FIG. 4 and uses a calibration box 22 (FIG. 3) to replace the calibration function of the smartphone 20. All other embodiment elements are unchanged from the first embodiment. Calibration box 22 is temporarily attached to the monitor box 40 via calibration signal cable 26 to calibrate microprocessor recognition of two forbidden body positions, number 1 (See FIG. 5) and number 2 (See FIG. 6). The calibration box 22 is connected to the monitor box 40 by a 20 foot long calibration signal cable 26 with an easy to connect calibration cable plug 36 that plugs into monitor box connector 38. The calibration signal cable 26 is protected from strain by an interwoven strength cable 30. The calibration box 22 (FIG. 4) includes a calibrate 1 pushbutton 80, a calibrate 2 pushbutton 82, and a rib tickler test pushbutton 84. The calibration box 22 includes a calibration box d-ring 24 for connection of the calibration box cable clip 28. The dog harness end of the strength cable terminates in a dog harness cable clip 32. This cable clip connects to the dog harness D-ring 34.

Operational Description—Second Embodiment

To understand this operational description refer to FIG. 1, FIG. 2, FIG. 3, FIG. 4, FIG. 5, FIG. 6, and FIG. 7. The training harness must be calibrated on the puppy or dog before house break training can occur. Before the usual time when the canine urinates or defecates the owner puts the puppy or dog into the dog harness 42 (FIG. 3), connects the calibration cable plug 36 to the monitor box connector 38, turns the on/off selector switch 76 on the monitor box 40 (FIG. 2) to the "on" position, and turns the guard/yard mode selector switch 74 on the monitor box 40 to the "yard" position. The on indicator light 78 turns on to indicate successful activation of the system and the yard mode prevents the system from alarming when the canine relieves itself during the calibration process. The puppy or dog is then placed in an enclosed yard, deck, or porch area and watched by the owner. When the canine assumes position one and urinates (see FIG. 5) the owner pushes the calibrate 1 pushbutton 80 on the calibration box 22 (FIG. 4) and the monitor box microprocessor (not shown) responds by recording the front distance sensor 52 and the back distance sensor 50 ground distance readings. The system is now calibrated for this puppy or dog so that the microprocessor will recognize the forbidden #1 body position when the canine is in the house and the system is in the "guard" mode. When the puppy or dog assumes position two and defecates (see FIG. 6) the owner pushes the calibrate two button 82 on the calibration box 22 and the monitor box microprocessor responds by recording the front distance sensor 52 and the back distance sensor 50 ground distance readings. The system is now calibrated for this canine so that the microprocessor will recognize the forbidden #2 body position when the puppy or dog is in the house and the system is in the "guard" mode.

The owner may test the operation of the right rib tickler 46 and the left rib tickler 48 (not shown) and the dog's response by pressing the rib tickler test pushbutton 84 on the calibration box 22 (FIG. 4).

The owner now moves the guard/yard mode selector switch 74 on the monitor box 40 (FIG. 2) from "yard" mode to "guard" mode and releases the canine into the house. The monitor box microprocessor monitors the puppy or dog's body position relative to the ground by sampling the front distance sensor 52 and the back distance sensor 50 data up to 10 times a second. The monitor box also samples the right boot pressure switch 60 in the right back foot boot 56 and the left boot pressure switch 62 in the left back foot boot 58. If the canine assumes and holds forbidden body positions #1, #2, or #3 in the house, an alarm condition is triggered. The canine receives a disconcerting vibration from the right rib tickler 46 and the left rib tickler 48 (not shown) that cause instant muscle tightening and prevent any bodily liquid or solid external elimination or marking. The appropriate monitor box alarm indicator (FIG. 2), #1 position alarm indicator light 66, #2 position alarm indicator light 68, or #3 position alarm indicator light 70 turns on so the owner knows what to watch for in the yard. At the same time, a buzzer alarm 64 for the owner is activated on the monitor box 40 so that the dog can immediately be let outside for #1 or #2 relief, reward, or other positive reinforcement. The owner turns the guard/yard mode selector switch 74 from the "guard" to the "yard" position before the dog is let outside and pushes the alarm reset pushbutton 72 that turns #1 position alarm indicator light light 66, #2 position alarm indicator light 68, or #3 position alarm indicator light 70 off. After relief and reinforcement, the owner turns the guard/yard mode selector switch 74 from "yard" mode back to "guard" mode and releases the dog into the house.

If the dog lifts a leg to mark territory while in the house (see FIG. 7), the right boot pressure switch 60 in the right back foot boot 56 or the left boot pressure switch 62 in the left back foot boot 58 will detect this and an exclusive-or function in the monitor box microprocessor program will trigger the alarm response actions as described above. These comprise activating the right rib tickler 46 and left rib tickler 48 (not shown), sounding the buzzer alarm 64, and turning on the #3 position alarm indicator light 70. The #3 position alarm indicator light 70 can be turned off with the same alarm reset pushbutton 72.

CONCLUSIONS, RAMIFICATIONS, AND SCOPE

Thus the reader will see that at least one embodiment of the canine house training harness provides a better way to housebreak a dog in that the canine receives effective training during the short teachable moment, the number of in-house messes during the training period is greatly reduced or even eliminated, the owner does not have to constantly watch an untrained dog during an extended training period, and money is not spent on cages or new rugs.

While the above descriptions contain some specificities, these should not be construed as limitations on the scope, but rather as exemplifications of two embodiments thereof. Other variations are possible. The distance measuring sensors may be acoustic, optical, infrared, laser, or use any other radio frequency. More than two distance measuring sensors may be used. Different sensor types may be attached on the same dog harness. Sensors may be mounted at other dog harness locations besides the dog harness chest-belly centerline, for example, on the dog's sides. The rib ticklers may be moved to another dog harness location, such as near the dog's belly or groin. A motion sensor may be added to enhance the body position detection function. Tilt sensors may be added to detect leg lift marking behavior in place of the pressure switch equipped back foot boots that are described.

One embodiment may use a Bluetooth capable remote calibration/alarm box other than a cell phone or the cable connected calibration box that has been described. One embodiment may use automatic self-calibration based on detecting and recording the canine's posture during repeated waste elimination events. One embodiment may detect forbidden in-house body positions by measuring the positions of the dog's body parts relative to each other without reference to the ground. One embodiment may be attached to a dog harness of any size so that a puppy or a dog of any size may be house trained. One embodiment may be waterproofed.

One embodiment may be used as an in house monitor to determine if a dog has relieved itself in the house while the owner has been away from home for a period of time. One embodiment may be used to refresh housebreak training for a dog that may have been incompletely trained previously.

The following parts may be eliminated without causing failure of the canine house training function. One rib tickler may suffice so that the other rib tickler may be eliminated. The rib tickler test button and test function may be eliminated. The alarm indicator lights, #1, #2, and #3, may be eliminated. The back foot boots equipped with pressure switches may be eliminated if the dog does not exhibit marking (leg lift) behavior in the house. Puppies usually do not exhibit this marking behavior until they are 12 weeks old. The wire harness may be eliminated if all the sensors, the rib ticklers, and the microprocessor communicate via Bluetooth or some other equivalent wireless technology.

While the above descriptions contain additional specificities, these should not be construed as limitations on the scope. The scope should not be determined by the embodiments illustrated, but by the appended claims and their legal equivalents.

I claim:

1. A canine housebreaking training machine comprising:
   a. a harness, wherein said harness is to be worn by a canine,
   b. a monitor box, wherein said monitor box is attached to said harness,
   c. a buzzer alarm,
   d. a #1 position alarm indicator light,
   e. a #2 position alarm indicator light,
   f. a #3 position alarm indicator light,
   wherein said buzzer alarm, said #1 position alarm indicator light, said #2 position alarm indicator light, and said #3 position alarm indicator light are in said monitor box,
   g. at least two distance sensors,
   h. at least one rib tickler,
   i. wherein said monitor box contains a microprocessor, and
   j. a wire harness, wherein said at least two distance sensors, and said at least one rib tickler are electrically connected to said microprocessor through said wire harness, wherein said microprocessor records distance sensor ground distance readings in order to calibrate or detect forbidden body positions assumed by the canine or initiate an alarm to the owner and inhibition of the forbidden body positions by the canine.

2. The canine housebreaking training machine of claim 1 wherein said at least two distance sensors are further comprised of a front distance sensor and a back distance sensor.

3. The canine housebreaking training machine of claim 1 further comprising: a battery, a battery holder, and an interconnection board.

4. The canine housebreaking training machine of claim 1 wherein said monitor box is attached to said harness by hook and loop fasteners that are glued to the monitor box and to said harness.

5. The canine housebreaking training machine of claim 1 further comprising a cell phone application that is used to obtain, record, and calibrate the forbidden body positions assumed by the canine.

6. The canine housebreaking training machine of claim 1 further comprising a right back foot boot, wherein said right back foot boot contains a right boot pressure switch, a left back foot boot, wherein said left back foot boot contains a left boot pressure switch, wherein said right boot pressure switch and said left back foot boot pressure switch are connected to said microprocessor of said monitor box, wherein the canine wears said right back foot boot and said left back foot boot, wherein said microprocessor has an exclusive-or function gating program which detects when either said right back foot boot or said left foot boot is lifted by the canine during the act of raising one leg to mark territory in order to identify it as the #3 position.

7. A method of housebreaking a canine comprising:
   putting a canine into a harness wherein the harness has:
      a monitor box attached to the harness, a buzzer alarm, a #1 position alarm indicator light, a #2 position alarm indicator light, a #3 position alarm indicator light, wherein the buzzer alarm, the #1 position alarm indicator light, the #2 position alarm indicator light, and the #3 position alarm indicator light are in the monitor box, wherein the monitor box has a control setting switch, wherein the control setting switch has a yard mode and a guard mode
      a front distance sensor,
      a rear distance sensor,
      at least one rib tickler,
   wherein the monitor box contains a microprocessor,
   a wire harness, wherein the front distance sensor, the rear distance sensor, and the at least one rib tickler are electrically connected to the microprocessor through the wire harness, wherein the microprocessor records readings of a distance of the front distance sensor from a ground and the rear distance sensor from the ground in order to calibrate forbidden body positions assumed by the canine,
   calibrating the harness for a #1 position by:
      placing the canine in an enclosed yard, deck, or porch area,
      turning the control setting switch on the monitor box to the yard setting in order to initiate recording of front sensor data and rear sensor data,
      a trainer or owner of the canine pushing a button on the monitor box of the harness when the canine assumes a position indicating urination in order to cause the microprocessor in the monitor box to record the front distance sensor distance from the ground and the rear distance sensor distance from the ground,
   calibrating the harness for a #2 position by:
      placing the canine in an enclosed yard, deck, or porch area,
      turning the control setting switch on the monitor box to the yard mode in order to initiate recording of front sensor data and rear sensor data,
      a trainer or owner of the canine pushing a button on the monitor box of the harness when the canine assumes a position indicating defecation in order to cause the microprocessor in the monitor box to record the front distance sensor distance from the ground and the rear distance sensor distance from the ground,
   releasing the canine into a house,
   turning the control setting switch on the monitor box to the guard mode which guard mode causes the front distance sensor to sample front distance sensor data and the rear distance sensor to sample rear distance sensor data in order to monitor the position of the canine, and causes the buzzer alarm to sound and the at least one rib tickler to be activated, to cause the canine to receive a disconcerting vibration, when the number #1 position or #2 position are assumed by the canine as detected by the front distance sensor and the rear distance sensor positions,
   subsequent to the buzzer alarm being sounded and the at least one rib tickler to be activated in the guard mode, placing the canine in the enclosed yard, deck, or porch area, turning the switch on the monitor box to the yard mode to reset the buzzer alarm and the at least one rib tickler in order to allow the canine to relieve itself, and
   releasing the canine into the house and turning the switch on the monitor box to the guard mode.

8. The method of claim 7, further comprising:
   wherein the harness further has a right back foot boot, wherein the right back foot boot contains a right boot pressure switch, a left back foot boot, wherein the left back foot boot contains a left boot pressure switch, wherein the right boot pressure switch and the left back foot boot pressure switch are connected to the microprocessor of the monitor box, wherein the canine is to wear the right back foot boot and the left back foot boot, wherein the microprocessor has an exclusive-or function gating program which detects when either the right back foot boot or the left foot boot is lifted by the canine during the act of raising one leg to mark territory in order to identify it as a #3 position, calibrating the harness for the #3 position by turning the control setting switch on the monitor box to the guard mode which guard mode allows the exclusive-or function gating program of said microprocessor to sample the position of said right back foot boot or said right foot boot, and when one leg is lifted by the canine to cause the buzzer alarm to sound and the at least one rib tickler to be activated, to cause the canine to receive a disconcerting vibration, when the #3 position is assumed by the canine, subsequent to the buzzer alarm being sounded and the at least one rib tickler to be activated in the guard mode, placing the canine in the enclosed yard, deck, or porch area, turning the switch on the monitor box to the yard mode to reset the buzzer alarm and the at least one rib tickler in order to allow the canine to relieve itself, and releasing the canine into the house and turning the switch on the monitor box to the guard mode.

\* \* \* \* \*